July 14, 1959
W. C. STRATMAN
2,894,331
PNEUMATIC GRIP GAUGE
Filed Aug. 30, 1955
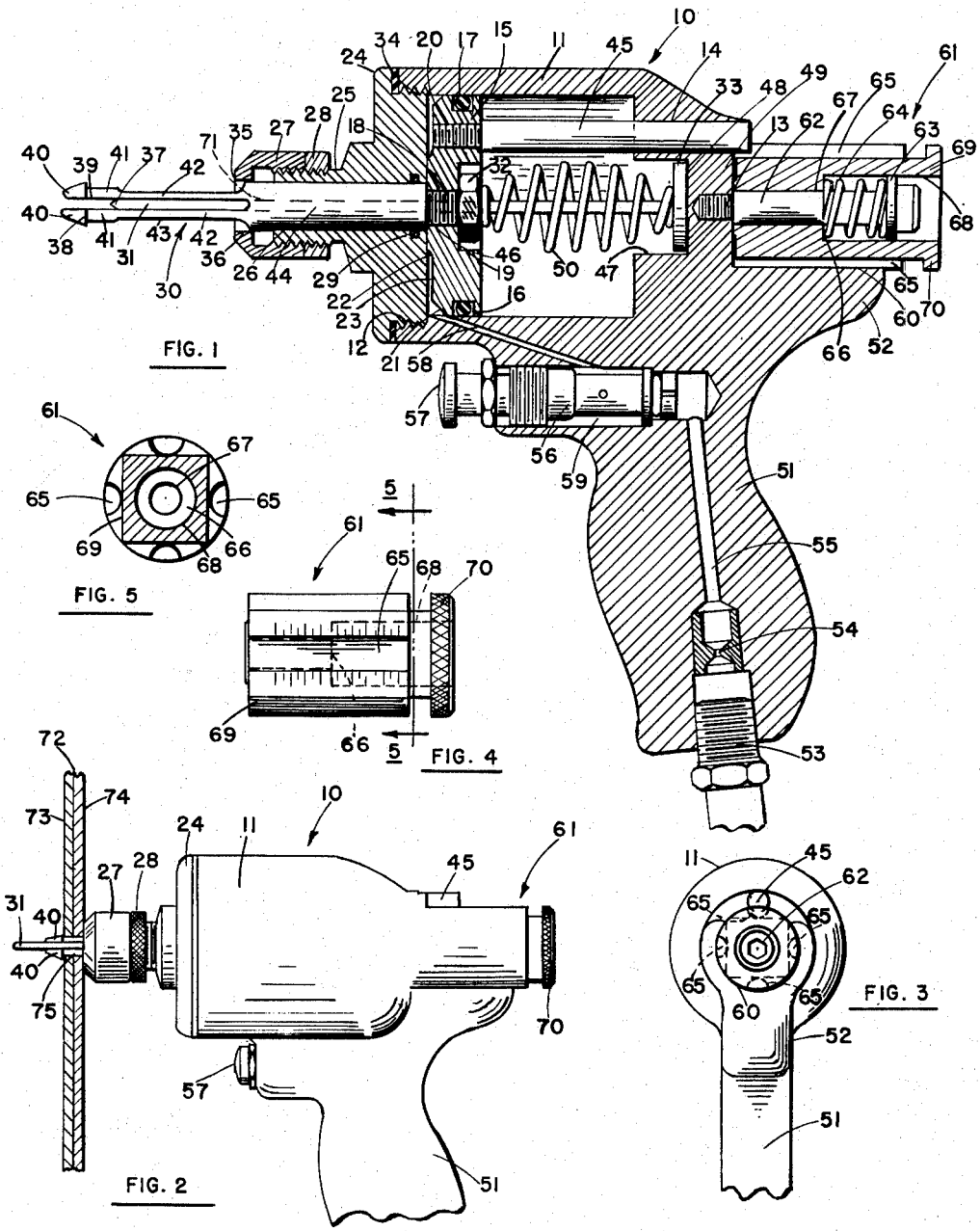
INVENTOR.
WILLIAM C. STRATMAN
BY
*William R. Lane*
ATTORNEY

United States Patent Office 2,894,331
Patented July 14, 1959

2,894,331

PNEUMATIC GRIP GAUGE

William C. Stratman, Los Angeles, Calif., assignor to North American Aviation, Inc.

Application August 30, 1955, Serial No. 531,316

11 Claims. (Cl. 33—143)

This invention relates to a gauging device and in particular relates to a pneumatic grip gauge for shop use to determine the correct lengths for fasteners to be used in assemblies.

In assembly operations grip length is critical with many types of fasteners and particularly so with certain "blind" fastening devices. Cumulative tolerances lead to deviations from nominal dimensions through assembled sections. Thicker sections and stronger materials present difficulties in obtaining accurate readings in gauging with existing devices.

The present invention is directed to a device whereby assembled sections are drawn tightly together by a pneumatic means, and when so drawn together the thickness of the assembly may be read directly from an appropriate scale on the device or the correct fastener length determined therefrom.

Accordingly, it is an object of this invention to provide a pneumatic grip gauge to accurately measure the correct lengths of fasteners required to be used in assemblies.

It is an object of this invention to provide a pneumatic grip gauge that draws the component sections of an assembly into close engagement so that the required fastener length may be accurately measured.

It is also an object to provide a pneumatic grip gauge capable of use with holes of various dimensions.

A further object is to provide a pneumatic grip gauge that is adjustable for wear so that its accuracy may be always maintained.

A still further object is to provide a pneumatic grip gauge having interchangeable calibrated scales suitable to the type of fastener to be employed.

These and other objects and advantages of the invention will become more apparent when read in the light of the accompanying drawings and specification wherein:

Fig. 1 is a longitudinal sectional view of the grip gauge before admission of air pressure and in a condition for insertion into a bore in the work assembly.

Fig. 2 is a fragmentary side elevational view illustrating the grip gauge in operation with the control button depressed, the work assembly tightly gripped by the gauge and the indicator pin extended out from the grip gauge cylinder along the scale.

Fig. 3 is a fragmentary rear elevational view of the grip gauge.

Fig. 4 is a top plan view of the detachable gauge element showing one of the four scales scribed thereon.

Fig. 5 is a sectional view taken in the plane of line 5—5 in Fig. 4.

Referring specifically to the drawings, wherein like reference characters have been used throughout the several views to designate like parts and referring at first to Fig. 1, the numeral 10 generally designates a pneumatic grip gauge having a cylinder 11. The cylinder is provided with an internally threaded opening 12 at the forward end thereof. Rearward end wall 49 of cylinder 11 is formed integrally with the cylinder and has a threaded axial hole 13 in the exterior side thereof and a vertically laterally displaced indicator pin bore 14 therethrough. The opening 12 of cylinder 11 is closed by the cylinder closure 24 using a suitable gasket and having the reduced diameter portion 34 of the closure threadedly engaging the cylinder. The cylinder closure has an externally threaded forwardly projecting extension 25. Threadedly mounted on and engaging the extension 25 are adjustable collar 27 and locking nut 28. The forward end of collar 27 has an annular face 35 for abutment against the work piece assembly and has a bore 36 therethrough concentric with the longitudinal axis of cylinder 11. Bore 26 extends through cylinder closure 24 and is similarly concentric with the cylinder longitudinal axis.

A rearward intermediate portion 44 of piston rod 30 is slidably mounted within bore 26, being sealed against outward leakage of the pressurizing air by means of an O-ring 29 mounted in an annular groove around the bore 26 in the closure 24. Piston rod 30 is bored axially as indicated at 71 to receive an expander pin 31 which has a rounded tip 37 at its forward end. The outer portion of rod 30 is bifurcated to a point approximately adjacent the rearward end of the reduced diameter central intermediate section 43 to form a pair of oppositely disposed flexible elements 42—42. Flexible elements 42—42 are given a permanent angular set toward each other so that they are normally nearer together at the tip end 40 than at any rearward point therefrom, thus providing oppositely disposed relatively tapered cam surfaces 39. As an alternate form of cam surface axial bore 71 could be made of a reduced diameter near the tip end of rod 30. In either construction as the piston rod 30 is moved rearwardly relative to expander pin 31 the rounded tip 37 of the expander pin contacts the cam surfaces 39 to expand the flexible elements 42—42. The conical bifurcated tip end 40 of rod 30 is reduced in diameter at the bifurcated forward intermediate section 41 to form shoulders 38. Sections 41 are designed to be .005 inch smaller than the material assembly hole size when the pin 31 has fully expanded the flexible elements 42—42. Piston rods of different dimensions are required for different nominal hole sizes in the material being gauged. The shoulders 38 on the conical bifurcated tip end of each particular rod 30 are of such a dimension as to readily pass through the particular fastener hole 75 while in an unexpanded condition. Upon expansion of the flexible elements 42—42 by means of the rearward movement of the piston rod 30 relative to the expander pin 31, the shoulders 38—38 are forced substantially radially outwardly to abut the back or far side of the work piece assembly 72.

Piston 15 is slidably disposed within cylinder 11. On the periphery of the piston, an O-ring 17 is located in annular groove 16 to make sealing contact with the inner surface of cylinder 11. A threaded axial hole 18 in the piston accommodates and engages the threaded rearward portion 46 of rod 30. The rearward face of piston 15 is counterbored at 19 to provide a recess for the nut 32 locking the rod 30 to the piston. Laterally disposed in a vertical direction from the cylinder axis and axially aligned with bore 14 is threaded bore 20 in the piston 15. Engaging the threaded bore 20 is a threaded end of indicator pin 45. The rearward portion of pin 45 is slidably mounted within bore 14 with the end of the pin projecting rearwardly therefrom.

Piston boss 22 projects co-axially forward from piston 15. The annular space around the boss in conjunction with the annular space around the chamfer 21 on the forward peripheral edge of the piston forms the initial air chamber 23.

Expander pin 31, slidably mounted within rod 30, extends through cylinder 11 along the longitudinal axis thereof, and terminates in a disk head 33 bearing against the rear surface 48 of socket 47 which is formed in the integral rear wall of the cylinder. Concentrically mounted within the cylinder on the expander pin is spring 50. The rearward end of the spring seats against the disk head 33 and the forward end bears against nut 32. As seen in Fig. 1, spring 50 exerts a force biasing the piston toward the forward end of the cylinder.

Attached to and integral with the cylinder 11 is a pistol grip handle 51 having a butt portion 52. The handle contains conventional air control and connector devices for operating the piston. These include an inlet air hose connection 53 in the bottom of the handle, an orifice restriction 54 to assist in controlling the supply air, a conduit 55 communicating with the orifice and inlet connection and the control valve chamber 59. The valve assembly 56 is of any conventional design suitable for being threadedly inserted into the valve chamber 59 and having a finger control button 57 extending outwardly therefrom. Conduit 58 provides communication between the valve chamber and chamber 23 at the forward face of the piston. The butt portion 52 of the handle has an arcuate cross sectioned groove 60 concentric with the cylinder longitudinal axis.

Gauge 61 comprises a cylindrical body 69 having an axial bore 67 and a counterbore 68 at the rearward end thereof. Four arcuate cross-section longitudinally extending indicator pin grooves 65 are spaced at 90° intervals on the periphery of gauge body 69. Each groove 65 has a different scale located linearly along the edges of the groove. The particular scale to be used is determined by the type of fastener being used at any given time. In the gauge of the present embodiment one scale is graduated for use with a Cherry rivet, one for use with a Jo-Bolt, one for use with a Du Pont explosive rivet and the fourth scale is graduated in sixty-fourths of an inch.

Gauge 61 is mounted in groove 60, with the groove 65 for the particular scale desired being aligned with indicator pin 45 so that the pin may move freely in the groove in a longitudinal direction. The gauge is firmly but movably mounted in groove 60 by means of bolt 62 passing through bore 67 and threaded into axial hole 13. Washer 63 is mounted under the bolt head and bears on the rearward end of spring 64 concentrically positioned on bolt 62. The forward end of spring 64 seats against internal shoulder 66 of the counterbore 68 within which the bolt head, washer 63, and spring 64 are recessed. This provides a resilient mounting means for the gauge 61.

In operation, to change from a piston rod 30 for a fastener hole of one particular size to a piston rod for another size hole, cylinder closure 24 is unscrewed from the cylinder and slid off of rod 30 along with attached collar 27 and nut 28. Piston 15 and the attached indicator pin 45 and piston rod 30 are removed from the cylinder along with expander pin 31 and spring 50. The expander pin and the spring may be removed by sliding the pin out of the bore 71. Upon removing the lock nut 32 the rod 30 may then be unscrewed and replaced by a different size piston rod, as required. The piston rod, piston, spring and expander pin are then assembled in reverse order, mounted in the cylinder and the closure 24 is then replaced on the cylinder.

To change the scale on the gauge 61 to correspond to the type of fastening being used, i.e., Cherry rivet, Jo-Bolt, or Du Pont rivet, etc., the flange 70 on the gauge 61 may be grasped by the fingers and the gauge pulled back, against the biasing force of spring 64, and then rotated to the desired scale. Upon releasing the gauge, it will be returned to its normal operational position by the spring 64.

In use, rod 30 is inserted through a drilled fastener hole 75 in the material assembly, to be gauged, so that the conical bifurcated tip end 40 is on the opposite side of the assembly. Pressurized air, controlled by valve assembly 56 through control button 57, is admitted through conduit 58 to chamber 23 to force the piston rearward against the spring 50. As the piston moves rearward, attached piston pin 30 is also moved in the same direction. Cam surfaces 39 acting against the stationary expander pin tip 37 spread the flexible elements 42—42 the proper amount so that the shoulders 38 engage the back surface 73 of the assembled sections. Continued movement of piston 15 retracts piston rod 30 until abutment surface 35 of collar 27 bears against the front surface 74 of the assembly. Simultaneously with the rearward movement of piston 15 fixedly attached indicator pin 45 is extended through the bore 14 a distance corresponding to the piston travel. The correct fastener grip length, which is determined by the distance between shoulders 38 and the abutment surface 35, may therefore be read directly from the appropriate calibrated scale on gauge 61 at a point opposite the end of the indicator pin, when the assembly is tightly gripped between shoulders 38 and surface 35. The piston is returned to the forward end of the cylinder by spring 50 upon release of air valve control button 57 which allows the air in the cylinder chamber 23 to exhaust to atmosphere. The flexible elements 42—42 move inwardly to their normal unsprung position as the piston rod moves to the left and away from the expander pin and the rod 30 may then be disengaged from the hole 75 in the assembly.

Accurate gauging may be readily accomplished with this unit since the air pressure applies sufficient force to draw the component sections into close engagement. A positive engagement of the assembly is provided by the shoulder portions in the expanded position. Piston rod 30 is readily removable to facilitate interchange of pins of proper size for use in holes of various diameters. Adjustable collar 27 and lock nut 28 provide a means for taking up wear or otherwise adjusting or calibrating the gauge. Shoulders 38 and abutment surface 35 must be in the same plane when the indicator pin gives a zero reading on gauge 61. This can be accomplished, if necessary, by moving collar 27 until the desired reading is achieved and then locking it in position by means of lock nut 28.

While a particular embodiment of this invention has been illustrated and described herein, it will be apparent that various changes and modifications may be made in the construction and the arrangement of the various parts without departing from the spirit and scope of this invention in its broad aspects or as defined in the following claims.

I claim:

1. A pneumatic grip gauge for measuring the thickness of an assembly having a hole therein comprising in combination a closed cylinder having an axial passage in one end thereof; a piston slidably mounted in said cylinder; a piston rod for insertion in the hole in the assembly and having an axial passage with a cam surface therein, said piston rod extending outwardly from one end of said piston through said cylinder end axial passage and having a bifurcated tip portion including an enlarged end forming shoulders thereon disposed opposite to and facing said one end of the cylinder; a pin secured to the other end of the cylinder and extending axially outward in said passage in said piston rod to a point near the bifurcated tip thereof; a scale on the other end of said cylinder; means attached to said piston for indicating the gauge of the assembly on said scale; control valve means for controlling the movement of said piston in said cylinder, said piston moving away from said one end of the cylinder when air is admitted to said cylinder thereby urging the piston rod shoulder toward said one end of the cylinder and expanding the bifurcated tip portion of the piston rod radially outwardly by the coaction of said pin on said cam surface whereby the assembly is firmly gripped between said expanded shoulder and said one end of the cylinder, said indicating means providing a measurement of the assembly thickness on said scale.

2. A pneumatic grip gauge for measuring the thickness of a body having a near surface and a far surface connected by an aperture extending through said body comprising a piston means, a first means operatively connected to said piston means and movable therewith adapted for insertion through said aperture and including a portion projecting therefrom in abutting contact with said far surface annularly about said aperture, a second means for operatively contacting the near surface of said body and coacting with said first means whereby the body may be firmly gripped between said first and second means upon operation of said piston means, and means operatively connected to said first means for indicating the gauge of the assembly gripped between said first and second means.

3. A gauging tool for measuring the thickness of a workpiece having substantially parallel near and far surfaces and having an aperture communicating between said surfaces comprising a first means for insertion through said aperture including a radially expansible end portion adapted for operatively contacting the far surface of said workpiece circumferentially around the periphery of said aperture upon expansion of said end portion, a second means for expanding said expansible end portion into contacting relationship with the peripheral aperture edge of said far surface after insertion of the expansible end portion through the aperture, a third means adapted to operatively contact the other one of said parallel surfaces and coact with said first means to grip the workpiece, and means operatively connected to said first means and said third means for indicating the thickness of the workpiece.

4. A gauging device for measuring the linear distance between two substantially parallel outer surfaces of a composite workpiece having aligned apertures therethrough connecting the surfaces comprising a first means for insertion through said aperture including an expansible end portion adapted for operatively contacting one surface of said workpiece annularly around the circumference of the aperture when in an expanded condition, a second means for expanding said expansible end portion into contacting relationship with said one surface, a third means movable relative to said first means adapted to operatively contact the other one of said parallel surfaces, means for moving said first means and said third means relative to each other whereby the workpiece elements may be drawn together and securely gripped between said first and third means, and means operatively connected to said first means and said third means for indicating the thickness of said workpiece.

5. A portable gauging device for measuring the thickness of a workpiece having two substantially parallel surfaces and having an aperture therethrough connecting the surfaces comprising an expansible means adapted for insertion through the aperture and having portions for contacting one surface of the workpiece when in an expanded state, a mandrel means adapted for insertion into said expansible means and movable relative thereto for expanding said expansible means whereby said portions contact the one surface of the workpiece, means for contacting the other one of said surfaces, pneumatic means for moving said expansible means and said contacting means relative to each other for gripping the workpiece therebetween, and means operatively connected to said pneumatic means for indicating the thickness of the workpiece.

6. A portable gauging device for measuring the thickness of a workpiece having two substantially parallel surfaces and having an aperture therethrough connecting the surfaces comprising a cylinder having a reciprocable piston therein, bifurcated expansible means having a cam surface thereon adapted for insertion through said aperture and operatively connected to said piston and having end portions adapted to contact the adjacent parallel surface of the workpiece when expanded, reciprocable mandrel means having sliding contact with said cam surface for expanding said expansible means whereby said end portions will be caused to contact the adjacent surface of the workpiece upon retraction of said piston and the workpiece will be securely gripped between said end portions and the juxtaposed end of said cylinder, and means operatively connected to said piston for indicating the thickness of said workpiece.

7. In combination, a closed cylinder having a reciprocable piston therein, a reciprocable expansible piston rod means integral with said piston adapted for insertion in an unexpanded state through an aperture in a workpiece, said expansible means having a shoulder portion disposed opposite to and facing said cylinder and adapted to contact the workpiece upon expansion of said expansible piston rod means, means for expanding said expansible means after insertion through the workpiece aperture, a nose portion on the forward end of said cylinder for coacting with said shoulder portion to firmly grip the workpiece when the piston is moved away from the workpiece, and means operatively connected to said expansible means for indicating the gauge of the workpiece gripped between said expansible means and said nose portion.

8. A gauging device for measuring the linear distance between the substantially parallel outer surfaces of a plurality of stacked workpieces having aligned apertures therethrough comprising a first means adapted for insertion through said aligned apertures including an expansible end portion adapted for operatively contacting one surface of said workpiece when in an expanded condition, a second means adapted to operatively contact the other one of said parallel surfaces and co-act with said first means to grip the workpiece, a pneumatic means for expanding said expansible end portion into contacting relationship with said other one surface after insertion through the aperture and for drawing the stacked workpieces tightly together between said first and said second means to permit accurate gauging of the correct assembly fastener lengths, and means operatively connected to said pneumatic means for indicating the thickness of the assembled workpieces.

9. A gauging tool for measuring the thickness of a composite workpiece having a plurality of substantially parallel surfaces and having an aperture connecting said parallel surfaces and substantially normal thereto comprising expansible means adapted for insertion through the aperture for firmly gripping said parallel surfaces over an annular area about said aperture upon expansion of said expansible means to exert an axial force coincident with the axis of the aperture without introducing eccentric forces, said annular area beginning at the peripheral edge of said aperture and extending outwardly therefrom, means for expanding said expansible means, and means operatively connected to said gripping means for indicating directly the thickness of the workpiece at said aperture.

10. A gauging device for measuring the thickness of a composite element having surfaces interconnected by an aperture through the element comprising expansible means extending completely through said aperture and having exterior portions contacting said surfaces of the element for gripping the same over a small area on each surface coincident with the aperture; at least one of said exterior portions being placed in contact with its adjacent surface by expansion of said expansible means; and means operatively connected to said expansible means for indicating the gauge of the element between said annular areas.

11. A gauging tool for measuring the thickness of a body formed of a plurality of members and having a near surface and a far surface connected by an aperture through said body comprising means adapted for firmly gripping the peripheral edges of said body around the aperture including an expansible portion extending through the aperture in the body and operatively contacting the far surface of the body circumferentially around the aperture; means for expanding said expansible portion; and means operatively connected to the first said means for directly indicating the thickness of the body.

References Cited in the file of this patent

UNITED STATES PATENTS

| Number | Name | Date |
|---|---|---|
| 620,337 | Lavigne | Feb. 28, 1899 |
| 455,644 | Sloane | July 7, 1891 |
| 1,110,879 | Brown | Sept. 15, 1914 |
| 1,985,576 | Mennesson | Dec. 25, 1934 |
| 2,501,130 | Kuppersmith | Mar. 21, 1950 |
| 2,560,194 | Simkus | July 10, 1951 |
| 2,563,440 | Wilson et al. | Aug. 5, 1951 |
| 2,622,331 | Haines | Dec. 23, 1952 |
| 2,627,664 | Moss | Feb. 10, 1953 |
| 2,630,632 | Brandon | Mar. 10, 1953 |